(12) United States Patent
Song (10) Patent No.: US 8,205,860 B2
(45) Date of Patent: Jun. 26, 2012

(54) VALVE WITH A STRUCTURE FOR MITIGATING ABRASIVE WEAR OR GALLING OF SEALING SURFACES BETWEEN A SEAT RING AND A CLOSURE MEMBER DURING THEIR RELATIVE SLIDING CONTACT WITH EACH OTHER

(76) Inventor: Yongsheng Song, Shanghai (CN)

( * ) Notice: Subject to any disclaimer, the term of this patent is extended or adjusted under 35 U.S.C. 154(b) by 525 days.

(21) Appl. No.: 12/377,303

(22) PCT Filed: Aug. 14, 2006

(86) PCT No.: PCT/CN2006/002051
§ 371 (c)(1),
(2), (4) Date: Feb. 12, 2009

(87) PCT Pub. No.: WO2008/031247
PCT Pub. Date: Mar. 20, 2008

(65) Prior Publication Data
US 2010/0193723 A1 Aug. 5, 2010

(51) Int. Cl.
*F16K 5/00* (2006.01)

(52) U.S. Cl. .................................. 251/314; 251/355
(58) Field of Classification Search ............ 251/315.01, 251/314, 355, 359
See application file for complete search history.

(56) References Cited

U.S. PATENT DOCUMENTS

| | | | | |
|---|---|---|---|---|
| 3,760,833 A * | 9/1973 | Kemp et al. | ............... | 137/246.22 |
| 4,151,855 A * | 5/1979 | Levin et al. | ................. | 137/15.22 |
| 4,286,614 A * | 9/1981 | Kacal et al. | ..................... | 137/72 |
| 6,047,952 A * | 4/2000 | Laskaris et al. | ........... | 251/315.11 |
| 6,669,171 B1 * | 12/2003 | Stunkard | .................. | 251/315.08 |

\* cited by examiner

*Primary Examiner* — John Fristoe, Jr.
(74) *Attorney, Agent, or Firm* — Global IP Services; Tianhua Gu (57) ABSTRACT

A ball valve or any other type of valve in which sealing surface of the seat ring and surface of closure member keep relative sliding contact during opening and closing movement of the valves. One or more annular grooves cut into sealing surface of the seat ring around it's bore are filled with lubricant or grease used for lubricating the surfaces so as to avoid or mitigate their abrasive wear or galling caused by frictional heat.

8 Claims, 5 Drawing Sheets

VALVE WITH A STRUCTURE FOR MITIGATING ABRASIVE WEAR OR GALLING OF SEALING SURFACES BETWEEN A SEAT RING AND A CLOSURE MEMBER DURING THEIR RELATIVE SLIDING CONTACT WITH EACH OTHER

FIELD OF THE INVENTION

The present invention is related to valves, particular to the valves in which sealing surfaces of seat rings and closure member suffer easily damage during their relative sliding contact, and the invention will protect them from abrasive wear or galling caused by frictional heat by means of a structure arranged in the sealing surface of the seat rings.

BACKGROUND OF THE INVENTION

In generally, sealing property between the sealing surfaces of the seat ring and closure member is a significant factor to affect leakage of the valve when it is in its fully closed position.

The valve in which the seat ring is made of polymer, known commonly as soft seated valve, has excellent sealing property, and the galling does not occur between the sealing surfaces of its seat ring and closure member so easy as metal seated valve does because of low friction coefficient of the polymer. The valve has long enough lifetime in general service, and is widely used.

For the fluid flowing through the valve at a higher temperature or carrying abrasive particles and/or powders, high temperature and wear resistant metal seated valve with hard facing is usually recommended to be first selected. Hard alloy and the like are normally coated, plated or welded on the surfaces of the seat ring and closure member when the metal seated valve are designed and manufactured. It is well known that the trademarks of mating coating material coated on the surfaces are different from each other generally, and their hardened hardness also varies in order to protect the sealing surface of the seat ring and the surface of the closure member against mutual abrasive wear or galling. The mating surface has to be machined precisely, too, and grinded with each other if necessary so as to increase their mutual sealing property. Therefore, not only the coating material should be resistance to high temperature, abrasion and corrosion, but it is also possessed of strong bond strength with its metallic matrix, furthermore it has low friction coefficient between the coated surfaces for lower operative torque or thrust of the valve.

In recent years, valve manufacturers in the world have diligently been searching for the materials possessing a low-friction coefficient, corrosion resistance, high hardened hardness, abrasive wear resistance and an ability being not apt to be scuffed, such as known from Node, et al., U.S. Pat. No. 5,108,813. Even so, abrasive wear or galling occurs frequently between the sealing surfaces of the seat ring and closure member of metal seated valve in actual service.

Frictional wear is a microscopic dynamic process occurred in material surface, and a complex process relating to behaviors of many subjects including mechanics, materials science, physics, chemistry and heat transfer science. According to analysis from the standpoint of physics and chemistry, wear occurs in the surfaces of two objects in relative sliding motion, and in a very thin layer of working surface. An important characteristic in the course of wear is that mechanical energy changes into heat energy, and the heating or cooling proceeds at very high velocity.

A lot of tests have shown that the abrasive wear is caused by hardness difference and galling by frictional heat. The real area of contact between mating surfaces of two bodies in relative sliding contact is far less than apparent area of contact, even though they are machined finely. The reason is that any surface has waviness and roughness whatever machining is made, and is seen microscopically as a series of asperities presenting serrated peaks, rather than the flat surface seen macroscopically, therefore the real interface of junctions between two relative sliding surfaces is only at the top of some peaks projected outwards from the surface. The softer peaks having the real interface will be sheared or microploughed by the harder peaks facing them during sliding contact relative to each other with the result that a wear fragment transfers from one surface to the other, and loss of material occurs. Meanwhile instantaneous high temperature caused by compression deformation or break at the interface will heat up the top of the peaks having small volume and tiny thermal capacity to cause their temperature to rise sharply and material of the top to become hardened, softened or phase transition. The instantaneous high temperature has the opportunity of causing the material of the interface to be risen up to melted level if the two surfaces slide quickly and repeatedly over a longer distance against each other under a bigger load, and the environment for dissipating heat around them is not so good, as a result abrasive wear or galling will occur at interface of the junctions between two surfaces.

It is also known that the abrasive wear or galling depends not only on a load exerted on sliding contact surfaces and relative sliding velocity between the two sliding surfaces, but on a distance that a smaller object slides over on a larger object, according to friction law that frictional force is proportion to contact load normal to the surfaces published by Mr. Amontons and Mr. Coulums, and the equation that material wear is proportional to load exerted on the surfaces and a distance sliding over relative to each other given by Mr. Archard.

Mr. Laitinen, et al. introduced a new parameter according to Mr. Archard's equation------lineal contact length (that is the overall sliding distance) affecting galling between the sealing surfaces of the seat ring and valve plug member in their WO patent publication No. 02/33299. Assuming static conditions and normal materials, the effect of the lineal contact length on the galling conditions can be determined from equation:

$$\text{Galling factor} = PVL^n$$

In this equation, P is the surface load exerted on the sealing surfaces of the seat ring and plug member, V is the sliding velocity during their relative motion, L is the lineal contact length that is a distance slid over on the sealing surface of the seat ring by a given stationary point in the surface of the plug member from this point contacting a leading edge of the sealing surface of the seat ring to it leaving its trailing edge, and n is an exponent having a value greater than 1.

When the seat ring is sliding on the surface of the plug member relatively, the lineal contact length L along its periphery varies in sliding direction of the plug member, therefore this value has a significant effect on the distribution of the frictional heat on the surface of the plug member, particular on the sealing surface of the seat ring.

The lineal contact length must be as short as possible in order to avoid or mitigate the abrasive wear and galling caused by frictional heat between the sealing surfaces of the seat ring and plug member. The embodiment disclosed by Mr. Laitinen, et al in WO patent publication No. 02/33299 describes that the recesses, grooves or concavities slightly staggered relative to each other in the direction of movement of the plug member are arranged on the sealing surfaces of the seat ring (if possible, including the surface of the plug member) in a dense pattern but spaced apart from each other, so that a continuous contact with the valve plug member in the lineal contact length is interrupted and divided into several portions without causing leakage passageways when the valve is in its fully closed position. These recesses, grooves or concavities may provide cooling spaces of dissipating the instantaneous frictional heat, not letting the temperature at the top of the peaks in the frictional surfaces rise over high, thereby reduce the possibility of the abrasive wear and galling between the sealing surfaces of the seat ring and plug member. But the effect is unsatisfactory either because the recesses, grooves or concavities are difficult to machine or because the instantaneous high temperature accumulated at the tops cannot be timely dissipated in some cases.

The fluid transported in pipeline becomes severer than ever with the great headway and rapid development of all kinds of process industries, and operation temperature, opening or closing speed, operational frequency and sealing property requirements of the valve are also higher and higher. Abrasive wear or galling occurs frequently between the sealing surfaces of the seat ring and closure member of metal seated valve due to generation of a great deal of frictional heat or difficulty in dissipating it when the valve is used in the higher temperature and the fluid carrying harder and harder particles or powders, even though it is operated in the range of suitable temperature. The sealing surface of the seat ring made of polymer will be carbonized by instantaneous high temperature caused by frictional heat in quick opening or closing and frequent operation, with the result that movement of the valve closure member becomes sluggish or is not agile. How to find a solution to the abrasive wear or galling due to instantaneous frictional heat begins to become a subject that valve manufacturers devote much time to their research.

THE SUMMARY OF THE PRESENT INVENTION

It is therefore an object of the present invention to provide a valve able to reduce damage between the sealing surfaces of the seat ring and closure member during operation of the valve, particular a structure of the sealing surface of the seat ring which prevents the sealing surfaces of the seat ring and valve closure member from abrasive wear or galling during their relative sliding contact.

Another object of the present invention is to provide a valve able to reduce damage between the sealing surfaces of the seat ring and closure member during operation of the valve, it can avoid or mitigate abrasive wear or galling caused by their relative sliding contact by means of the structure of the sealing surface possessing the features of high efficiency, simplicity, easy processing and low manufacturing cost.

Another object of the present invention is to provide a valve able to reduce damage between the sealing surfaces of the seat ring and closure member during operation of the valve, in which the structure of the sealing surface can dramatically reduce friction coefficient between the sealing surfaces of the seat ring and closure member during their relative sliding contact, and thus reduce friction force between them.

Yet another object of the present invention is to provide a valve able to reduce damage between the sealing surfaces of the seat ring and closure member during operation of the valve, in which the structure of the sealing surface can quickly absorb and dissipate part of instantaneous high temperature caused by frictional heat between the sealing surfaces of the seat ring and closure member during their relative sliding contact.

Still another object of the present invention is to provide a valve able to reduce damage between the sealing surfaces of the seat ring and closure member during operation of the valve, in which the structure of the sealing surface can enhance the sealing property of the sealing surfaces between the seat ring and closure member.

A further object of the present invention is to provide a valve able to reduce damage between the sealing surfaces of the seat ring and closure member during operation of the valve, in which the structure of the sealing surface can reduce kinetic energy of particles or powders carried in fluid impinging on the upstream surface of the closure member so as to mitigate erosion of it.

A yet further object of the present invention is to provide a valve able to reduce damage between sealing surfaces of the seat ring and closure member during operation of the valve, in which new lubricant or grease needs not to be supplied for the structure of the sealing surface in service until scheduled maintenance, and a minimum of lubricant or grease is stored in the structure, so its pollution of the fluid in the valve is maximally reduced.

A still further object of the present invention is to provide a valve able to reduce damage between the sealing surfaces of the seat ring and closure member during operation of the valve, so that the valve according to the present invention can not only be suitable for the application of the fluid carrying abrasive particles and powders, but also the application in need of quick opening and closing or frequent operation.

The present invention relates to ball valve or any other type of valves in which sealing surface of a seat ring and surface of a closure member are always in relative sliding contact with each other. The invention has attained these objects by means of one or more annular grooves 27 or curved grooves 36 (but equivalent to part of annular groove 27) which are cut in sealing surface 21 of seat ring 14 around its bore used for storing the lubricant or grease, or annular grooves 27 with two partitions 30 inserted into each of them to divide it into two groove 31 and 32, or annular grooves 27 with a corrugated ring 35 set in each of them to divide it into many small spaces 34, so that covered by the surface of closure member 17, the lubricant or grease stored in grooves 31, 34 or 36 would not flow away from them during opening or closing operation of the valve. The ball valve equipped with the structure of the invention will be an example of any other type of valves and be described below in detail.

DETAILED DESCRIPTION OF PREFERRED EMBODIMENTS

There are various kinds of valves, in which surface of a closure member of some valves always keeps relative sliding contact with part or all of sealing surface of a seat ring during their on-off or regulating operation. The principle and consequence of the sliding contact are the same as the description above. For the convenience, embodiments of the present invention are disclosed below in detail combining with the configuration of the ball valve shown in FIG. 1 and the sealing surface of the seat ring shown in FIG. 2.

Figure 1:
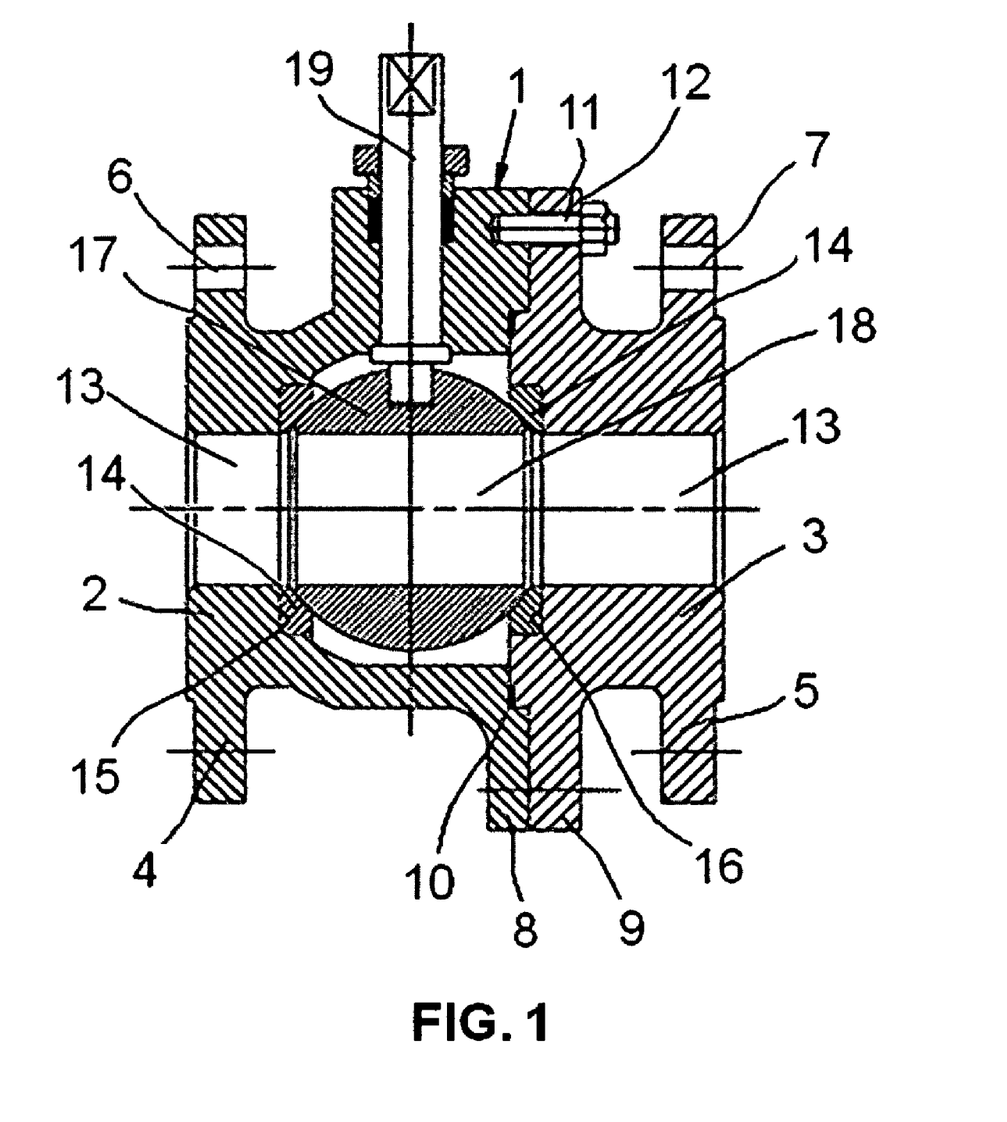
FIG. 1 is elevation sectional view of a prior art ball valve in fully open position.
Figure 2A:
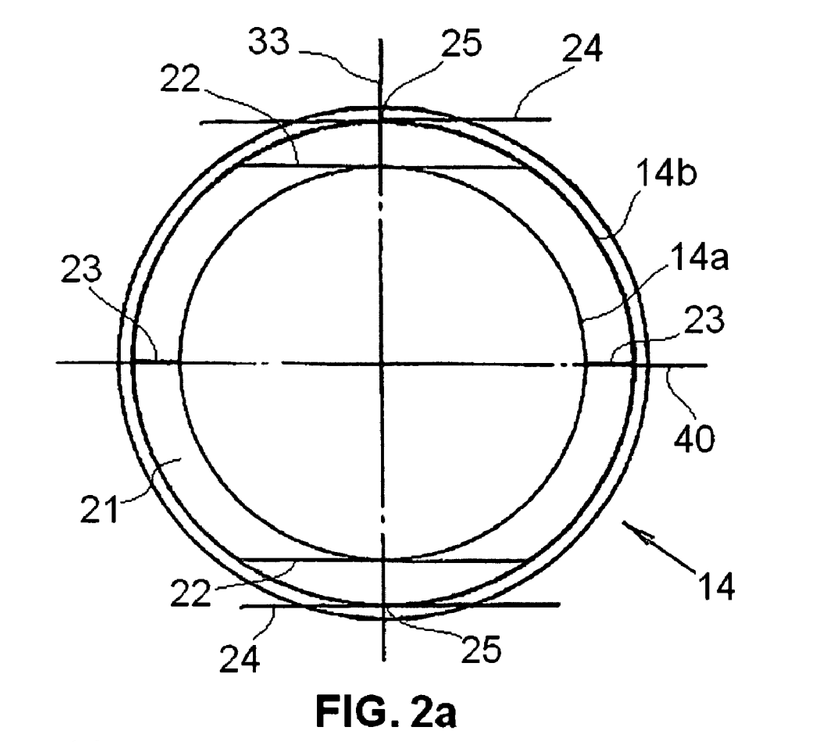
FIG. 2a and FIG. 2b are respectively an elevation view and a 22 top cross-sectional view of seat ring taken along horizontal axis 40 in FIG. 2a, FIG. 2a shows length of sliding contact lines at different points along periphery of the seat ring during relative sliding motion on surface of a ball closure member.
Figure 2B:
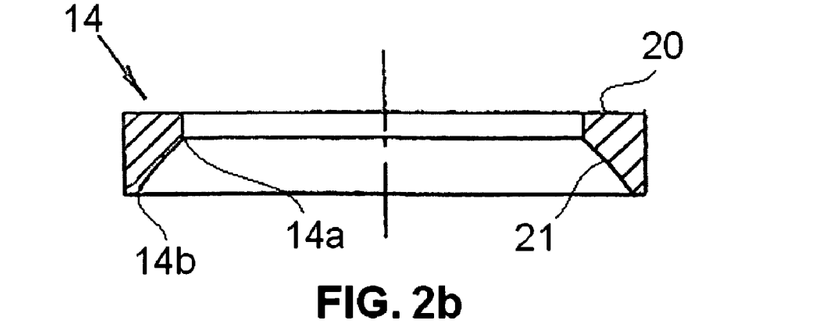

FIG. 1 is an elevation sectional view of a prior art ball valve, which consists of a valve housing 1, a ball closure member 17 with a regular curvature surface, a stem 19 and two seat rings 14. Valve housing 1 is formed by the interconnection of a left-hand housing section 2 and a right-hand housing section 3 equipped respectively with flanges 4 and 5 on their external ends, used to be connected with pipelines by plurality of bolts and nuts (not shown) threaded through holes 6 and 7 in them, and with other flanges 8 and 9 on their internal ends, between which is disposed a gasket 10 used to effect a seal. One end of stud bolts 11 is screwed into tapped holes in flange 8 of housing section 2, and the other end of them extended through registering holes in flange 9 of housing section 3. Nuts 12 are screwed onto the free ends of stud bolts 11, make flanges 8 and 9 join together. Gasket 10 will be compressed, and flanges 8 and 9 touch tightly when fastened together by nuts 12, thereby two housing sections 2 and 3 form a whole valve housing 1. A pair of annular seat rings 14 is held within recesses 15 and 16 of left-hand housing section 2 and right-hand housing section 3 encircling passageways 13 respectively, and clamped between valve housing 1 and ball closure member 17, and their bore has the same inner diameter as the bore of passageways 13 of housing sections 2 or 3 adjacent to it generally. A elastic distortion will be created after two seat rings or seat seals (not shown) arranged between shoulder of recesses 15 and 16 and the back of seat rings 14 are compressed, so that a large sealing force is produced between the surface of ball closure member 17 and sealing surface 21 (refer to FIG. 2) of the seat rings. A cylindrical flowway 18 extends through ball closure member 17, and its axis passes through the center of ball closure member 17. The valve is opened when the axis of flowway 18 is aligned with the axis of passageways 13 of housing sections 2 and 3. The surface of ball closure member 17 will completely block passageways 13 in fully closed position after ball closure member 17 is rotated 90° on its axis by stem 19.

FIG. 2 consists of FIG. 2a and FIG. 2b. Radial end face 20 of seat ring 14 abuts against shoulder of annular recesses 15 and 16 in valve housings 2 or 3, the other one 21 opposite to end face 20 keeps sliding contact with the surface of ball closure member 17 and generates a lot of instantaneous frictional heat under sealing force during on-off or regulating operation of the valve. The area of sealing surface 21 of seat ring 14 is much smaller than the surface area of ball closure member 17, so sealing surface 21 has to slide over a long distance on the surface of ball closure member 17 during operation of the valve.

On the other hand, the lineal contact length varies along the periphery of sealing surface 21 of seat ring 14 in direction of their mutual sliding movement (as horizontal lines shown in FIG. 2a), in which two horizontal lines 22 drawn tangentially past inner edge 14a of sealing surface 21 of seat ring 14 are the longest distance (the longest lineal contact length) slid across sealing surface 21 of seat ring 14 by a given stationary point in the surface of ball closure member 17 when ball closure member 17 rotates on its axis 33 vertical to horizontal line 40 in FIG. 2a. The lineal contact length decreases gradually in either direction from lines 22, so that a horizontal line 40 passing through the centre of seat ring 14 and across sealing surface 21 of seat ring 22 is the second shortest sliding line 23, and two horizontal lines 24 drawn tangentially past outer edge 14b of sealing surface 21 of seat ring 14 are the shortest sliding distance, two points 25 in fact. Accordingly quantity or area of interface of junctions participating in sliding contact with the surface of the ball closure member 17 in the longest sliding length 22 of sealing surface 21 is the most, as compared with the other sliding lines, and meanwhile the same quantity or area of interface of junctions in the line equivalent to the length of line 22 in the surface of ball closure member 17 also participates in sliding contact and slides across line 22, so that the interfaces around the lines 22 are the location of generating a great deal of frictional heat regardless of whether they are in the surface of the ball closure member or the sealing surface of the seat ring, and should also be a potential position of causing easily abrasive wear or galling tendency.

Particles or powders in fluid, which sizes are less than the clearance between face to face valleys belonging to each sliding surface, will enter into it driven by pressure differential of fluid, and they form three-body abrasive wear together with two sealing surfaces. In this case, the larger the extrusion force exerted upon junctions of the peaks, the easier loss of material from the surfaces is. At the same time the friction coefficient between the surfaces becomes very large and causes the instantaneous frictional heat to be risen greatly, the possibility of abrasive wear or galling increases sharply. If the temperature of the fluid itself is high and its heat conduction is not so good, it will be much easier to bring them about abrasive wear or galling.

Figure 3:
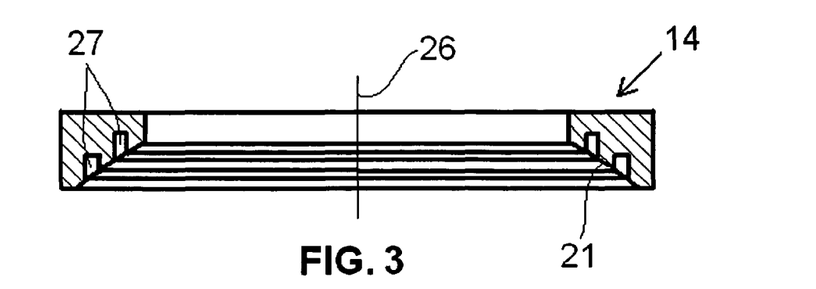
FIG. 3 is a top cross-sectional view of the seat ring in FIG. 4.

Referring now to FIG. 3 showing an embodiment of the present invention, wherein one or more annular grooves (two annular grooves 27 shown in FIG. 3) concentric with inner or outer edges of the seat ring 14 are cut in the sealing surface 21 of the seat ring 14. Grooves 27 is filled with the lubricant or grease used for lubricating the surface of ball closure member 17 and sealing surface 21 of seat ring 14 in relative sliding contact referring to FIG. 1), and two surfaces will become separated from each other after the lubricant or grease is coated and firmly adhered on them. The lubricant or grease can be repeatedly coated on the surface of the closure member with it sliding continuously across grooves 27, and then on the sealing surface of the seat ring keeping sliding contact with it during on-off or regulating movement of the valve, and keep holding on interfaces of the junctions in each surface and filling into the valleys around the peaks to form several layers of very thin and coriaceous molecular or fluid film. These oil films make the original dry friction between two interfaces in the prior art valve become the friction between the lubricant or grease films coated respectively on them so that the frictional coefficient of their relative sliding motion is reduced.

The lubricant or grease film is also a good endothermal body and heat conductor, the lubricant or grease filled into the valleys around the peaks and having much larger thermal capacity than the peaks will absorb not only the instantaneous high temperature generated by frictional heat between the junctions during their relative sliding contact, but also dissipate the heat not to make the temperature at the interfaces rise to the melted level bringing them to galling.

In addition, the lubricant or grease is a good sealant, too, and can be used for increasing sealing property between the surface of ball closure member 17 and sealing surface 21 of seat ring 14. The lubricant or grease film can prevent the particles and powders carried in fluid from entering the clearance between the valleys. The lubricant or grease film keeps separating sealing surface 21 of seat ring 14 from surface of ball closure member 17 to be free them from direct contact even if the particles or powders had entered the clearance and formed three body abrasion, so that they wound not suffer abrasive wear or galling.

The lubricant or grease film can partially adsorb kinetic energy of the particles or powders impacting vertically on upstream surface of the ball closure member also, and make the particles or powders impacting on it at a sloping angle slide across it due to low frictional coefficient and not stay at the stagnation point on the impacted surface, thus the kinetic energy converted into the energy digging surface material of the ball closure member is reduced as much as possible during impingement.

In the embodiment described above, the area between upper and lower two horizontal lines 22 on the right side of the sealing surface of seat ring 14 will be partly or wholly uncovered by the surface of ball closure member 17 during on-off or regulating operation of the valve, except in fully open or closed position. Thus, not only the lubricant or grease stored in shorter grooves 32 in this area will escape, but also the lubricant or grease in the other longer covered grooves 31 in the rest of the area of the sealing surface on the left side will do through the opened grooves 32 in a short time, so that the valve will be damaged very fast after the sealing surfaces have lost the lubricant or grease coated on them.

Figure 4:
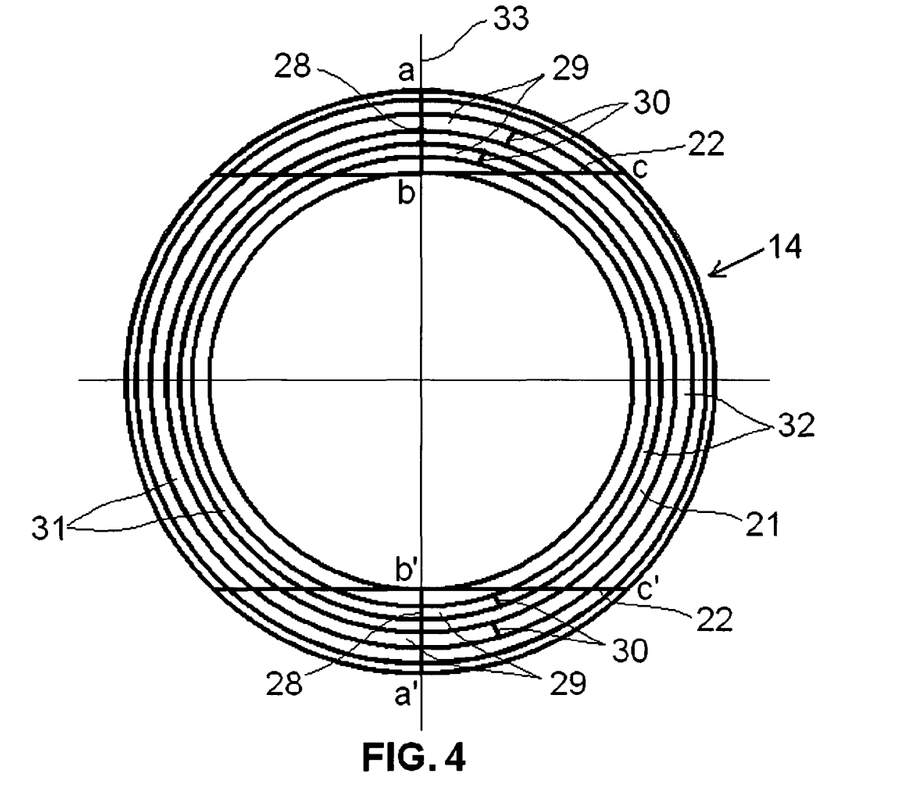
FIG. 4 is an elevation view showing an embodiment of the present invention.

FIG. 4 is another embodiment of the present invention related to FIG. 3. Four pieces of partition 30 are inserted into four grooves 29 (part of annular grooves 27) defined respectively by two segments ab and a'b' of vertical line 33 and two segments bc and b'c' of horizontal lines 22. One of end faces of partition 30 adjacent to the surface of ball closure member 17 has the same geometric figure and curvature as the sealing surface of the seat ring and keeps sliding contact with the surface of closure member 17. The other end face and its interior and exterior circumferential surfaces are tightly abutted on the bottom face and interior and exterior circumferential surfaces of annular grooves 29 respectively. Partition 30 separates longer grooves 31 which are always covered by the surface of ball closure member 17, from shorter uncovered grooves 32, so that grooves 31 and 32 become two independent spaces and the lubricant or grease stored in them cannot flow each other. Therefore the lubricant or grease stored in grooves 32 will not bring the lubricant or grease stored in grooves 31 flowing away when it starts to escape from groove 32 uncovered by the surface of the closure member during on-off or regulating movement of the valve. Furthermore, even though all the lubricant or grease stored in grooves 32 has flowed away, the lubricant or grease stored in grooves 31 will still lubricate the same area in the surface of ball closure member 17 just like done before. Both of the surface of ball closure member 17 and sealing surface 21 of seat ring 14 are oiled twice during each opening and closing cycle of the valve.

Figure 5:
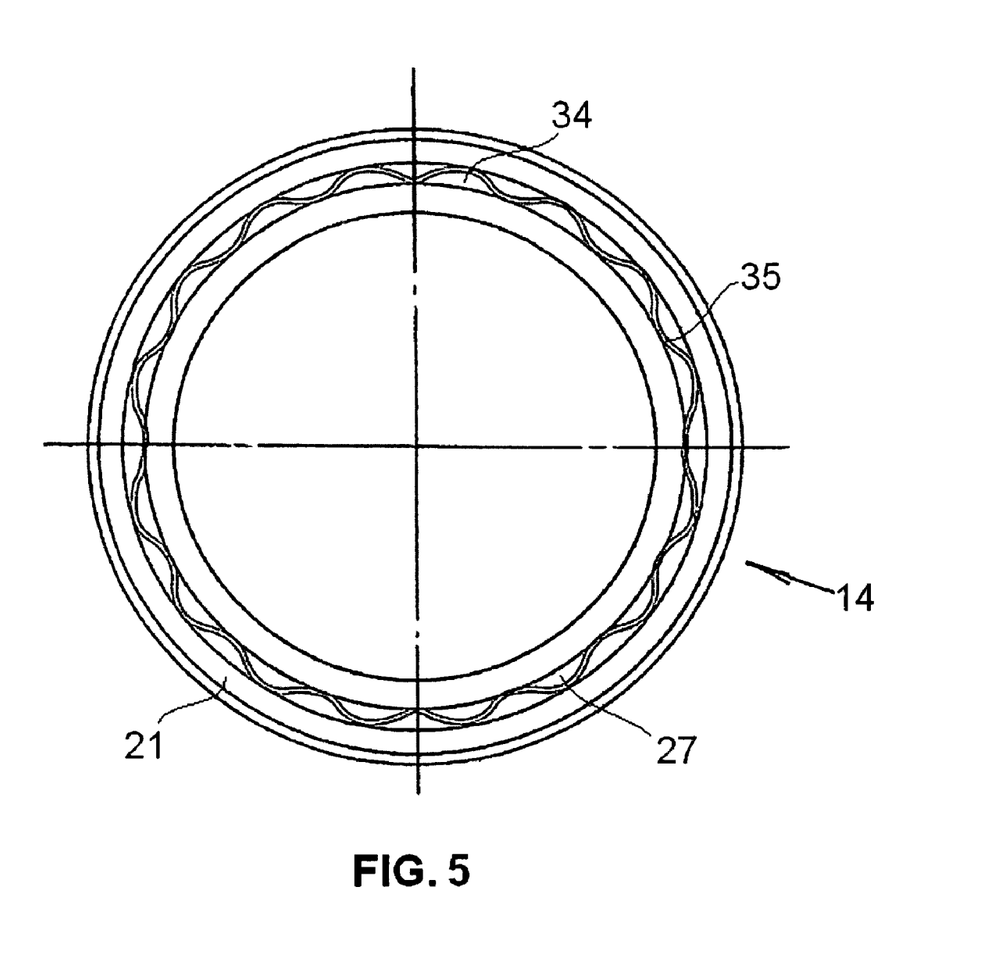
FIG. 5 is another embodiment of the present invention, showing an elevation view of improved seat ring.

In the embodiment illustrated in FIG. 5, a wavy ring 35 shaped from corrugated sheet or cut off from a special-shaped tube is set into an annular grooves 27 of sealing surface 21 of seat ring 14. One of end faces of corrugated ring 35 adjacent to the surface of ball closure member 17 has the same geometric figure and curvature as sealing surface 21 of seat ring 14 and keeps sliding contact with the surface of the closure member in the course of their relative sliding motion. The other end face of it and its interior and exterior circumferential surface are tightly abutted on the bottom face and interior and exterior circumferential surfaces of annular groove 27 respectively, thus corrugated ring 35 divides groove 27 into many separate spaces 34 used for storing lubricant or grease individually. The lubricant or grease stored in spaces in the covered area will be not brought flowing away, with the lubricant or grease stored in whichever space in the uncovered area escaping, so this embodiment can also attain the object to still oil the same area in the surface of closure member 17 just like done before, as the embodiment in FIG. 4. Even though corrugated ring 35 can be shaped into any other shapes with wavy circumference cross-section, such as arc, triangular or rectangular, etc., they have the same principle.

Figure 6:
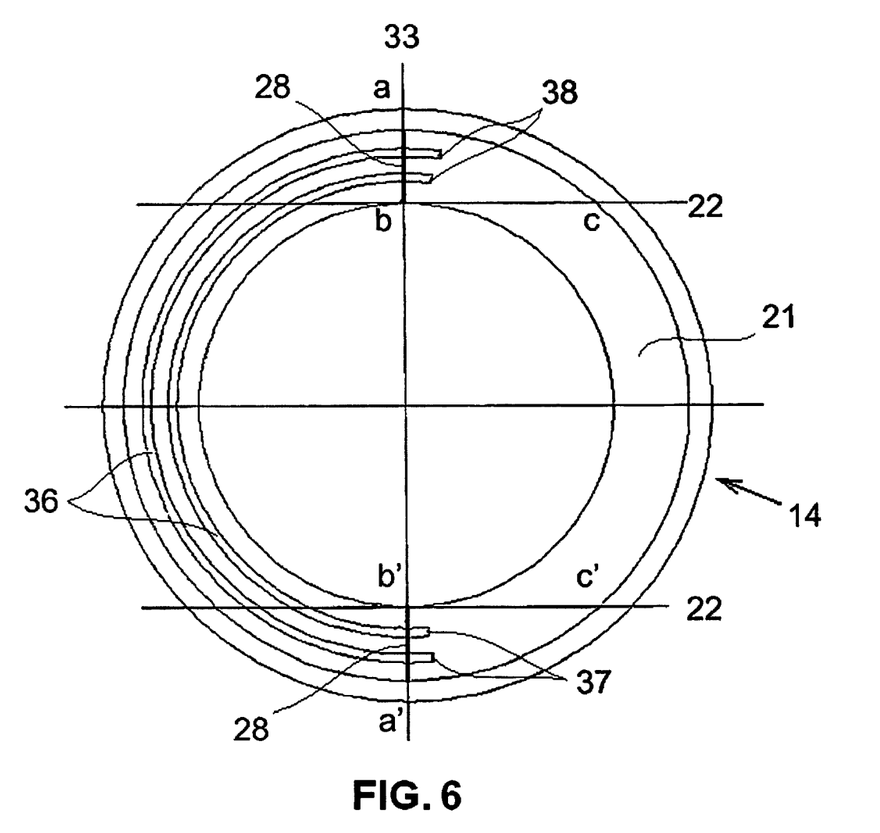
FIG. 6 is a further embodiment of the present invention, showing an elevation view of improved seat ring.

FIG. 6 is another embodiment of the present invention, showing two pieces of curved groove 36, namely equivalent to part of annular groove 27, shaped by cutting in sealing surface 21 around bore of the seat ring 14. Two ends 37 and 38 of curved groove 36 are located in the areas defined by segments ab and bc, and segments a'b' and b'c' on the right side of sealing surface 21, just like partitions 30 shown in FIG. 4. The arc length of curved grooves 36 is the same as grooves 31 of annular grooves 27 in the embodiment of FIG. 4, and the lubricant or grease stored in grooves 36 is always covered by the surface of ball closure member 17, so it is kept wherein and wound not escape, but the surface of the closure member will be automatically oiled with the surface sliding continuously across groove 36, and then the sealing surface of the seat ring keeping sliding contact with it will be done during on-off or regulating operation of the valve. The lubricant or grease stored in grooves 36 in according with the embodiment will also lubricate the same area as the other embodiments described above. The benefit of the embodiment is that any type of the corrugated ring or partitions need not be inserted into annular groove 27 in the covered areas of sealing surface of the seat ring as the embodiments in FIG. 5 and FIG. 4. The principle and functions of the lubricant are the same as the other embodiments, so not described any more.

Although the present invention was described in terms of specific embodiments, it is obvious to a person skilled in the art that various alterations and additions are possible without departing from the spirit of the invention which is set out in the appended claims, therefore the extent disclosed in the embodiments above is only for purpose of illustration and not intended to be limited by this description.

What is claimed is:

1. A valve possessing a structure in sealing surfaces (21) of seat rings (14) used for mitigating abrasive wear or galling between it and surface of closure member (17) in their relative sliding contact during its on-off or regulating movement, said valve comprising of:
   a. a body housing, said body housing having an upstream passageway and a downstream passageway and an inner chamber therebetween for disposing the closure member (17) has a pair of annular recesses composed of a shoulder and an interior circumferential surface encircling said passageways and being close to the inner chamber for accommodating the seat rings (14) respectively;
   b. the closure member (17), said closure member (17) being disposed in said inner chamber, and its exterior surface keeping relative sliding contact with part or all of the sealing surface (21) of the seat rings (14); and
   c. two seat rings (14), said seat rings (14) are positioned within said annular recesses in the passageways of said body housing, and are clamped between said body housing and said closure member (17) respectively, the sealing surface (21) of each of said seat rings (14) is in a sliding contact with the exterior surface of said closure member (17) for shutting off the fluid flowing in said body housing when the valve is closed, and has an opposite end face abutted on the shoulder in said annular recesses; and a bore of said seat rings (14) encircles the passageways respectively;

wherein two annular grooves (27) around the bore of said seat rings (14) are arranged in sealing surface (21) of said seat rings (14) and filled with lubricant or grease used for oiling repeatedly said sealing surface (21) and the exterior surface of said closure member (17) to create an additional coating on both of the surfaces;

two partitions (30) for dividing each of annular grooves (27) into two separate grooves (31) and (32) are respectively inserted into each piece of grooves (29) in areas defined by two segments (ab) and (bc), as well as two segments (a'b') and (b'c') on the sealing surface (21) of said seat rings (14), in which the segments ab and a'b' are projecting lines of a line (28) passing through centre of the seat rings (14) onto the sealing surface (21), the segments bc and b'c' are projecting lines of two lines (22) being vertical to the line (28) and tangentially past inner edge (14a) of sealing surface (21) of seat rings (14) onto the sealing surface (21), both bc and b'c' are on the same side of the line (28).

2. The valve of claim 1, wherein a corrugated ring (35) is set into one of said annular grooves (27) of sealing surface (21) of seat rings (14), inner and outer diameters of the corrugated ring (35) are equal to the corresponding diameters of said annular groove (27) respectively, and said corrugated ring (35) divides each of said annular groove (27) into many separate spaces (34).

3. The valve as recited in claim 1, wherein the end surface of partitions (30) adjacent to the surface of said closure member (17) has the same geometric figure and curvature as the sealing surface (21) of said seat rings (14) and keep sealingly sliding contact with the exterior surface of said closure member (17) respectively.

4. The valve of claim 1, wherein the spaces of said grooves (31) and (32) divided by said partitions (30) are sealingly separated from each other.

5. The valve of claim 2, wherein said corrugated ring (35) is shaped from a corrugated sheet or cut off from a special-shaped tube having a wavy circumference cross-section.

6. The valve of claim 1, wherein said annular grooves (27) are concentric with the sealing surface (21) of said seat rings (14).

7. The valve as recited in claim 2, wherein the end face of said corrugated rings (35) adjacent to the exterior surface of said closure member (17) has the same geometric figure and curvature as the sealing surface (21) of said seat rings (14) and keeps sealingly sliding contact with the exterior surface of said closure member (17).

8. The valve of claim 2, wherein the separate spaces (34) divided into by said corrugated ring (35) are sealingly separated from each other.

* * * * *